Figure 3:
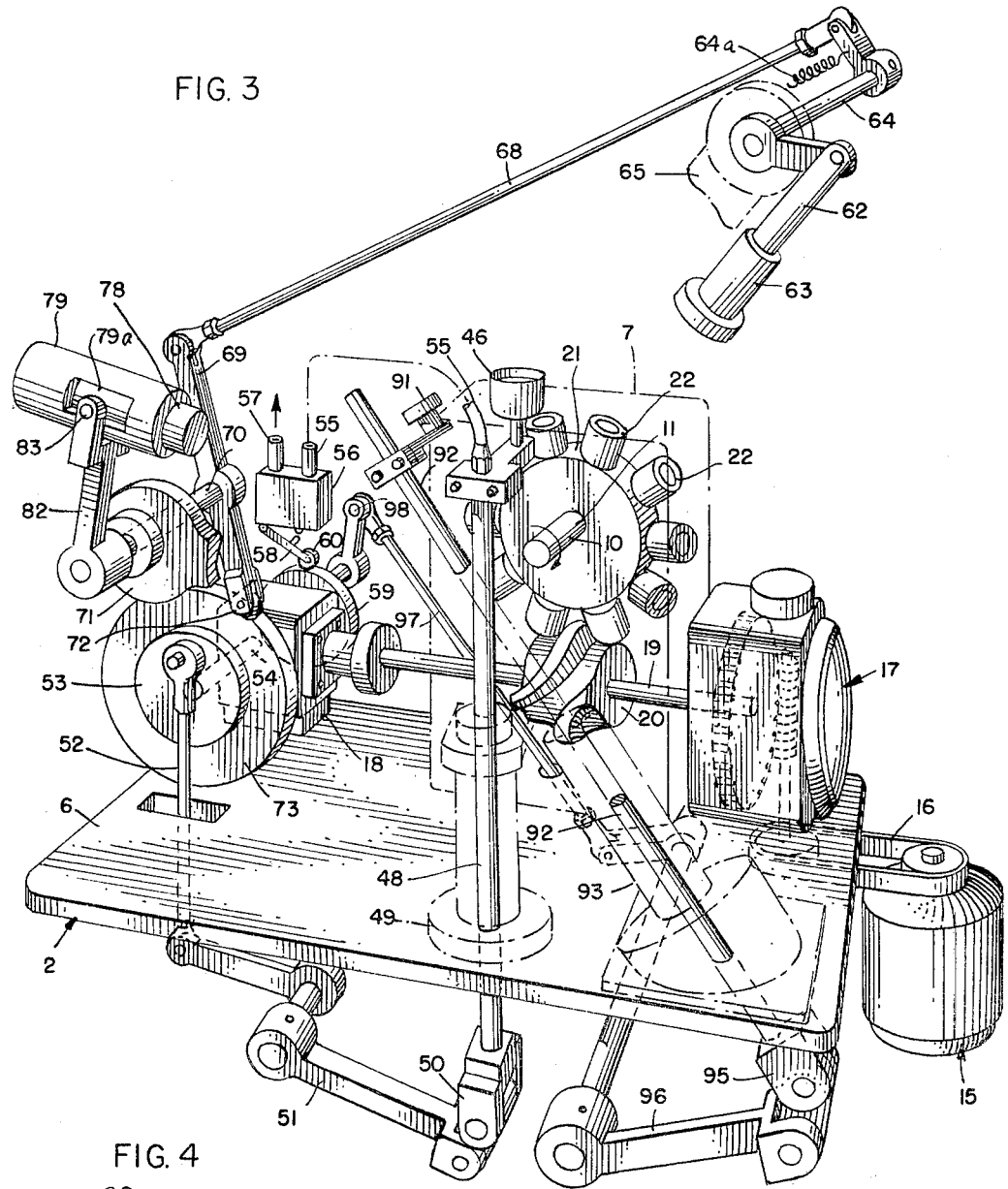

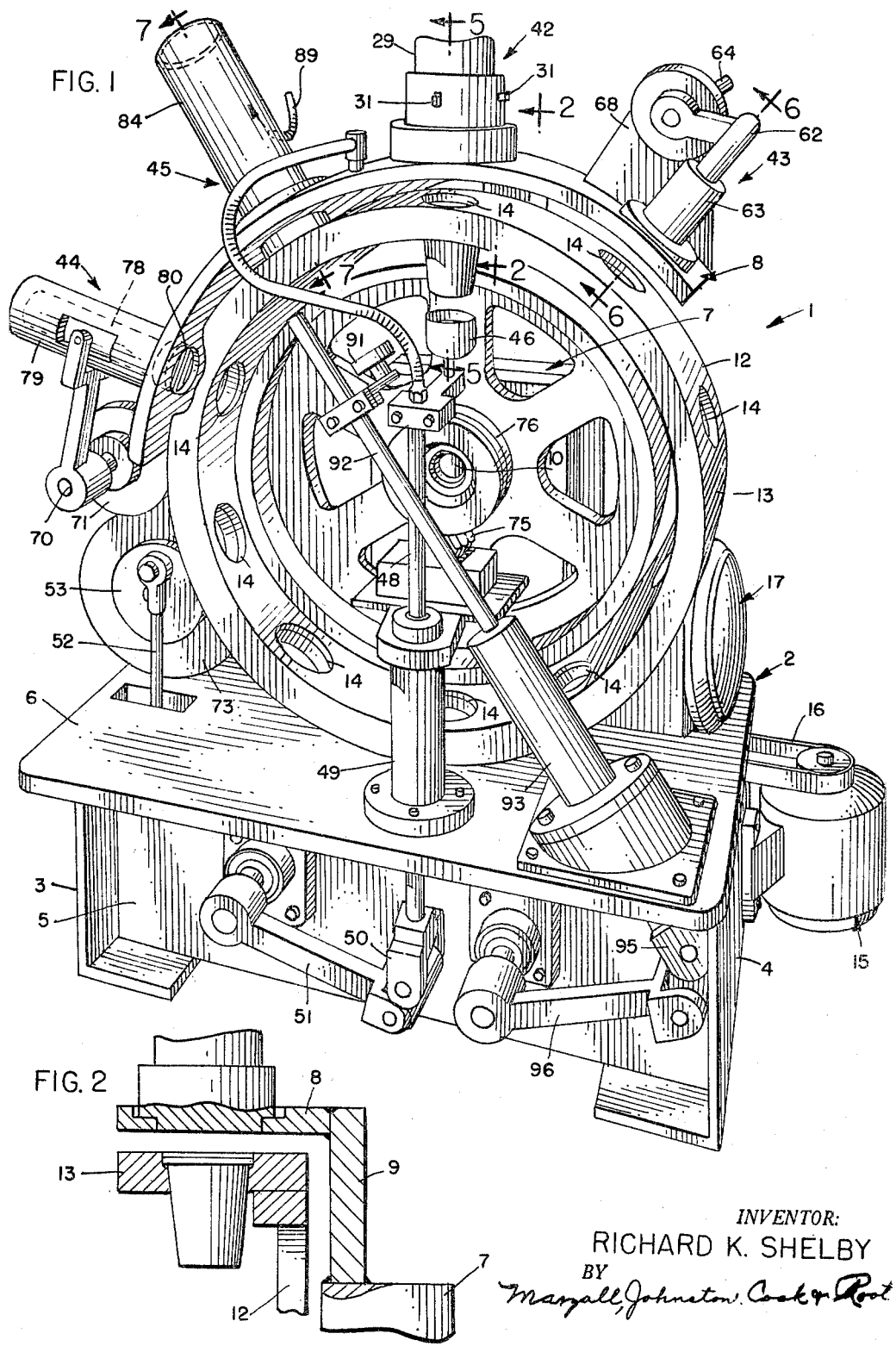

Sept. 6, 1966 R. K. SHELBY 3,271,503
METHOD AND APPARATUS FOR FORMING PLASTIC ARTICLES
Filed May 8, 1961 3 Sheets-Sheet 2

INVENTOR:
RICHARD K. SHELBY
BY
Marzell, Johnston, Cook & Root
ATT'YS

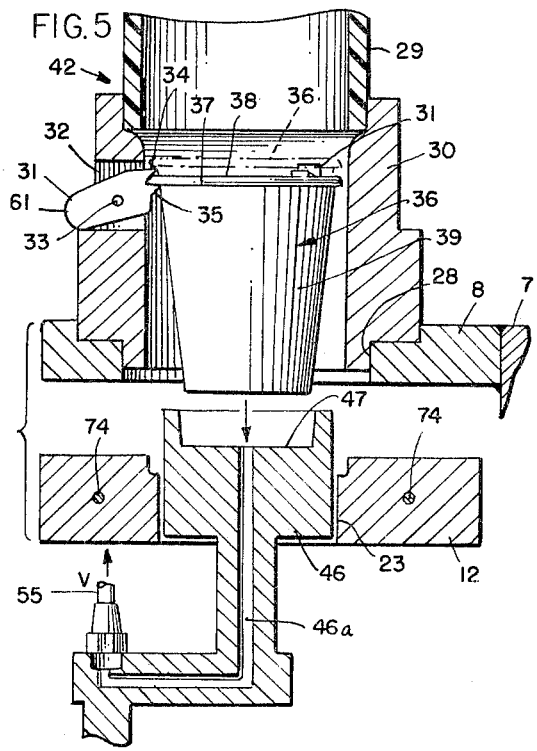
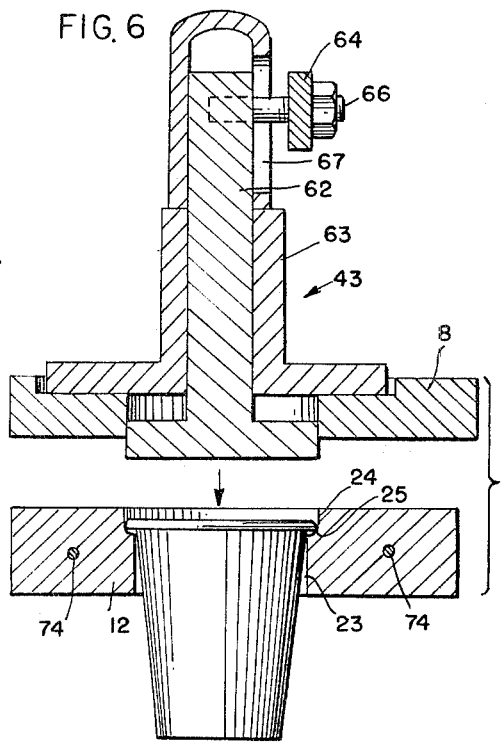
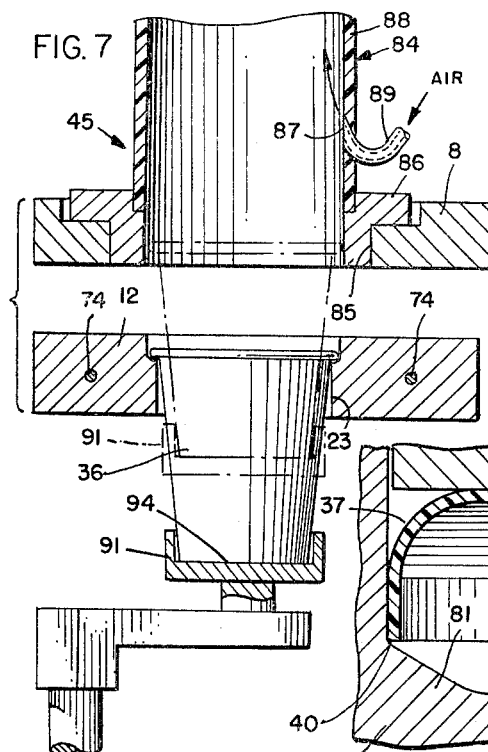
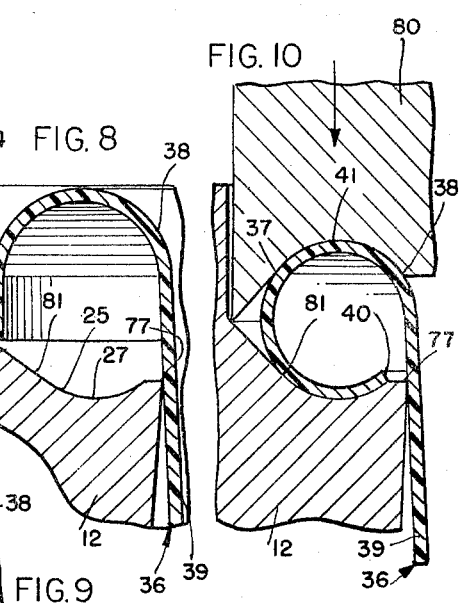
INVENTOR:
RICHARD K. SHELBY
BY Marzall, Johnston, Cook & Root
ATT'YS United States Patent Office 3,271,503
Patented Sept. 6, 1966

1

3,271,503
METHOD AND APPARATUS FOR FORMING
PLASTIC ARTICLES
Richard K. Shelby, Chicago, Ill., assignor, by mesne assignments, to Monsanto Company, a corporation of Delaware
Filed May 8, 1961, Ser. No. 108,569
6 Claims. (Cl. 264—322)

This invention relates to a novel method and apparatus for forming thermo-plastic articles, and, more particularly, to a novel method and apparatus for forming turned-over edges or beads on the lips of plastic cups, and the like.

It is a primary object of the present invention to afford a novel method and novel apparatus for forming turned-over edges on the lips of plastic cups, and the like.

Methods and apparatus have been heretofore known in the art for turning over the edge portions of the lips of plastic cups, and the like. However, such methods and apparatus as have been heretofore known in the art have had several inherent disadvantages, such as, for example, not forming a tightly turned edge portion; requiring excessively large apparatus or machinery; requiring apparatus which was complicated in construction and operation and difficult to produce commercially; not being capable of operating at the rates of production which are required in commercial production; or not being practical and efficient in operation, or the like. It is an important object of the present invention to overcome such disadvantages.

Another object of the present invention is to enable the edge portions of the open ends of plastic cups, and the like, to be turned over in a novel and expeditious manner to form a substantially closed flange or bead around the open end of the cups, and the like.

Another object is to enable such beads to be formed on plastic cups, and the like, at a highly satisfactory rate for the commercial production of such articles.

Yet another object is to afford novel apparatus for turning over the free edge portions of the lips of plastic cups, and the like, wherein the parts of the apparatus are so constituted and arranged that tightly turned flanges may be formed thereby on plastic cups, and the like, in a novel and expeditious manner.

A further object is to enable apparatus of the aforementioned type to be afforded, which is fully automatic in operation.

An object ancillary to the foregoing is to afford novel apparatus of the aforementioned type wherein cups, the upper edges of which are to be so turned, may be fed automatically seriatim into, through, and out of the apparatus in a novel expeditious manner.

Another object of the present invention is to afford a novel method and apparatus for forming turned-over lips on the open end portions of plastic cups, and the like, wherein, during the operation, the cups, or the like, are locally heated in a novel and expeditious manner so that substantially only the edge portion which is to be so turned is heated.

A further object is to afford novel apparatus of the aforementioned type which is practical and efficient in operation and may be readily and economically produced commercially.

Other and further objects of the present invention will be apparent from the following description and claims and are illustrated in the accompanying drawings which, by way of illustration, show a preferred embodiment of the present invention and the principles thereof and what I now consider to be the best mode in which I have contemplated applying these principles. Other embodiments of the invention embodying the same or equivalent principles may be used and structural changes may be made as desired by those skilled in the art without departing from the present invention and the purview of the appended claims.

Figure 4:
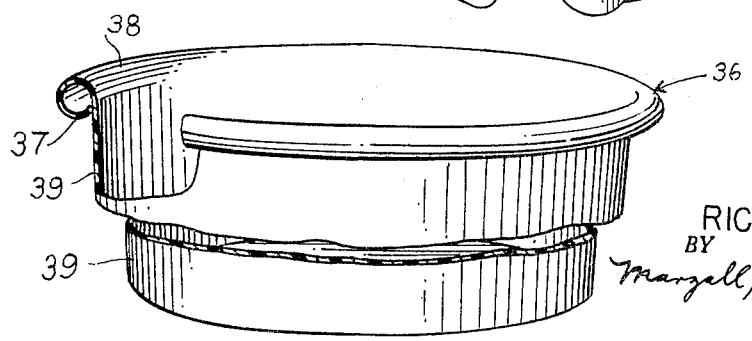

In the drawings:
FIG. 1 is a perspective view of a machine embodying the principles of the present invention;
FIG. 2 is a fragmentary sectional view taken substantially along the line 2—2 in FIG. 1;
FIG. 3 is a fragmentary perspective view of the machine shown in FIG. 1, with certain parts removed to show underlying parts;
FIG. 4 is a fragmentary perspective view of a completed cup constructed in accordance with the principles of the present invention;
FIG. 5 is an enlarged, fragmentary, detail sectional view taken substantially along the line 5—5 in FIG. 1;
FIG. 6 is an enlarged, fragmentary, detail sectional view taken substantially along the line 6—6 in FIG. 1;
FIG. 7 is an enlarged, fragmentary, detail sectional view taken substantially along the line 7—7 in FIG. 1;
FIG. 8 is an enlarged, fragmentary, detail sectional view of a portion of the machine shown in FIG. 6;
FIG. 9 is an enlarged, detail sectional view similar to FIG. 8, but showing the parts of the machine shown in FIG. 6 disposed in different operating position; and
FIG. 10 is a detail sectional view similar to FIGS. 8 and 9, but showing the forming die of the machine shown in FIG. 1.

A machine 1, embodying, and operable in accordance with, the principles of the present invention, is shown in the drawings to illustrate the preferred form of the present invention.

The machine 1 includes a base 2 having substantially upright end legs 3 and 4 disposed in substantially parallel spaced relation to each other, and a substantially upright partition wall 5 extending longitudinally of the base 2 substantially perpendicular to the legs 3 and 4. A substantially horizontally extending platform 6 is mounted on and secured to the upper edges of the legs 3 and 4 and the partition wall 5 in overlying relation thereto. The base 2 may be made of any suitable material such as, for example, steel, and the members 3–6 may be suitably secured together, such as, for example, by welding.

A housing 7, FIGS. 1 and 2, is secured to and projects upwardly from the rear portion of the upper face of the platform 6. A substantially arcuate-shaped supporting plate 8, which is concave downwardly, is disposed upwardly and forwardly of the housing 7 in spaced relation thereto, FIGS. 1 and 2. The supporting plate 8 is supported in such relation to the housing 7 by an upright supporting member 9, the lower end of which is welded, or otherwise suitably secured to the upper end of the housing 7, and the upper end of which member 9 is welded or otherwise suitably secured to the rear edge of the supporting plate 8, FIG. 2.

A drive shaft 10, FIGS. 1 and 3, is journalled in and rotatably supported by the housing 7, and has one end portion 11 projecting forwardly from the housing 7. A wheel 12 is mounted on and supported by the front end portion of the drive shaft 10, forwardly of the housing 7, and is secured to the drive shaft 10 for rotation therewith. The wheel 12 includes a forwardly projecting outer peripheral flange or rim 13 which is substantially rectangular in transverse cross-sectional shape, FIGS. 1 and 2. The flange 13 has ten openings 14 extending radially therethrough in equally spaced relation to each other around the periphery thereof, for a purpose which will be discussed in greater detail presently.

A motor 15 is mounted on and supported by the base 2, and is operatively connected by a belt 16 to a reduction gear unit 17 mounted on one end of the platform 6. A gear unit or gear housing 18 is mounted on the other end of the platform 6, and a drive shaft 19 extends between and is rotatably supported by the reduction gear unit 17 and the gear housing 18, below the drive shaft 10. The drive shaft 19 extends through the housing 7, and is operatively connected to the reduction gear unit 17 and is rotatable thereby upon actuation of the reduction gear unit 17 by the motor 15 for a purpose which will be discussed in greater detail presently.

A cam 20 is mounted on and secured to the drive shaft 19 for rotation therewith substantially vertically below the drive shaft 10, FIG. 3. A drive wheel 21 is mounted on the drive shaft 10 within the housing 7, and has ten cam followers 22 mounted on and projecting substantially radially outwardly from the outer periphery thereof in equally spaced relation to each other around the periphery thereof. The cam 20 is of such construction, and is so disposed relative to the drive shaft 10 and the wheel 21 that it is effective to drivingly engage the cam followers 22 so that upon each rotation of the drive shaft 19, upon actuation of the reduction gear unit 17 by the motor 15, the wheel 21 is caused to rotate in a clockwise direction, as viewed in FIG. 3, through one-tenth of a revolution. Hence, it will be seen that upon each rotation of the drive shaft 19, the drive shaft 10 and the wheel 12 are likewise caused to rotate one-tenth of a complete revolution in a clockwise direction, as viewed in FIG. 1.

The openings 14 extend completely through the flange 13 of the wheel 12, and the side walls defining each of the openings 14 have a substantially frusto-conical shaped lower end portion 23, an enlarged substantially cylindrical-shaped upper end portion 24, and a generally downwardly and inwardly sloping intermediate portion 25 extending between the lower end portion 23 and the upper end portion 24, FIGS. 7–10. As may be seen in FIGS. 8–10, the intermediate portion 25 of the side wall defining each of the openings 14 has an upper edge portion 26, which is of substantially inverted frusto-conical shape, and a lower edge portion 27, which is concave upwardly in shape.

The supporting plate 8 has an inlet opening 28 extending substantially radially through the upper portion thereof, and an inlet tube 29 is secured to the opening 28 by a suitable coupling member 30, FIGS. 1 and 5. The coupling member 30 has three elongated pawls 31 extending through respective openings 32 in the upper end portion thereof, the pawls 31 being disposed in a common horizontal plane and being equally spaced from each other around the periphery of the coupling member 30. Each of the pawls 31 is pivotally mounted is a respective opening 32 on a pin 33, each of the pawls 31 projecting both inwardly and outwardly from the respective opening 32. Each of the pawls 31 has an upper tooth 34 and a lower tooth 35 formed on the inner end thereof and afford supports for cups to be operated upon in the machine, such as the cups 36 shown in FIG. 5, when such cups are being fed from the inlet tube 29 through the coupling member 30 into the machine 1, as will be discussed in greater detail presently.

The free edge portions 37 of the lips 38 on the side walls 39 of the cups 36, when the cups 36 are being fed from the inlet tube 29 into the machine 1, project outwardly and downwardly from the remainder of the side walls 39 of the cups 36, as shown in FIGS. 8 and 9. After the cups 36 have passed through the machine 1, and are discharged therefrom, as will be discussed in greater detail presently, the free edge portions 37 of the lips 38 thereof, are turned inwardly toward the remainder of the side walls 39 in such position that the free edges 40 of the free edge portions 37 are disposed closely adjacent to the outer face of the side walls 39 and face substantially directly toward the remainder of the side walls 39, or even slightly upwardly, as shown in FIGS. 4 and 10. This finished positioning of the free edge portions 37 of the cups 39 affords a substantially closed bead or flange 41 on the lips 38, with the beads 41 being substantially annular in transverse cross section, as shown in FIG. 10. With the bead 41 so constructed, it affords a smooth, substantially round free edge for the lip 38 of the cup 36. Such construction for the cups 36 has the advantage of affording an especially pleasing finished appearance; affording a rounded edge which is entirely comfortable to the touch of the user's lips or fingers thereon; affording an entirely smooth, exposed surface on the free edge of the lips 38, wherein no sharp edge may be contacted by the lips or the fingers of the user of the cups 36, thus eliminating all danger of the user being cut thereby; and affording a cup having good stacking characteristics so that it is particularly well adapted for use in automatic vending machines, and the like.

It will be appreciated by those skilled in the art that although cups 36 are disclosed herein, this is merely by way of illustration, and not by way of limitation, and that the present invention is also well adapted for the production of other open-topped vessels such as, for example, open-topped bowls, pans, vases, and the like.

The machine 1 is so constituted and arranged that there are four work stations 42, 43, 44, and 45 disposed around the periphery of the wheel 12 in spaced relation to each other, FIG. 1. As will be discussed in greater detail hereinafter, in the operation of the machine 1, cups 36 with the relatively open free edge portions 37 on the lips 38 thereof, shown in FIGS. 8 and 9, are fed into the openings 14 in the flange 13 of the wheel 12; the cups are next firmly seated in the openings 14 at work station 43; the cups then move from work station 43 to work station 44, and during this movement, the free edge portions 37 of the lips 38 are heated to a temperature high enough to render the free edge portion 37 readily deformable; at work station 44, the heated free edge portions 37 of the lips 38 are turned over to afford the substantially closed bead 41, shown in FIG. 10; and the cups then move to work station 45, at which station they are discharged from the machine 1, radially outwardly of the wheel 12. In the operation of the machine 1, the cups 36 are automatically fed, seriatim, into respective ones of the openings 14 in the wheel 12; and the other operations on the cups 36, including the discharge thereof from the machine 1 at work station 45, are also performed fully automatically in timed relation to each other.

The openings 14 are so positioned in the wheel 12, and the work stations 42–45 are so disposed around the wheel 12, that upon completion of each movement of the drive shaft 10, and, therefore, of the wheel 12, through one-tenth of a revolution by the cam 20, the wheel 12 stops in such position that each of the work stations 42–45 is disposed in axial alignment with a respective one of the openings 14. The work station 43 is so disposed relative to the work station 42 that after a cup has been fed into an opening 14 aligned with the work station 42, that cup moves to work station 43 during the next successive movement of the wheel 12. The work station 44 is so positioned relative to the work station 43 that movement of the last mentioned cup from work station 43 to work station 44 requires seven successive such movements of the wheel 12. The work station 45 is so disposed relative to the work station 44, that during the next successive movement of the wheel 12, the last-mentioned cup is moved from the work station 44 to the work station 45. It will be remembered that at the work station 45, the cup is discharged outwardly from the machine 1. The work station 45 is so disposed relative to the work station 42, that during the next successive rotation of the wheel 12, the empty opening 14, which has been just vacated by a cup at the work station 45 moves into alignment with the work station 42 for the reception of another cup 36 from the inlet tube 29. In one successful machine which has been constructed, embodying the principles of the present invention, and which machine has ten openings 14 in the wheel 12 thereof, the machine is capable of producing finished cups at a rate wherein the wheel 12 rotates through one complete revolution in approximately eleven seconds, or, in other words, at a rate of one cup every one and one-tenth second. Although the machine 1 is shown with only one wheel 12, it will be appreciated by those skilled in the art that machines having a plurality of such wheels may be afforded without departing from the purview of the present invention.

At work station 42, wherein the cups 36 are fed into the machine 1, a shelf or platform 46, having a concavity 47 in the upper face thereof, FIGS. 1, 2 and 5, is disposed radially inwardly of the tube 29 and the coupling member 30. The concavity 47 in the shelf 46 is of such size and shape as to relatively freely receive the bottom of a cup 36 therein. The shelf 46 is secured to and carried by the upper end portion of a rod 48 which is disposed in vertical position, and is slidably supported in a housing 49 mounted on the upper face of the platform 6 of the base 2. The rod 48 extends downwardly through the platform 6, and the lower end portion thereof is pivotally connected by linkage 50 to one end of a bell crank lever 51 which is journalled in the wall 5, FIGS. 1 and 2. The other end of the bell crank lever 51 is connected by a link 52 to an eccentric 53 mounted on and secured to a drive shaft 54 which is journalled in and projects outwardly from the gear housing 18, FIG. 3. The drive shaft 54 is operatively connected to the drive shaft 19 by gearing, not shown, within the gear housing 18, and is rotated by the drive shaft 19 at the same speed of rotation as the drive shaft 19. The connection between the eccentric 53 and the rod 48 is such that upon each rotation of the eccentric 53, the rod 48 is reciprocated downwardly and upwardly a sufficient distance to move the shelf 46 from the upper position thereof shown in FIG. 5 and the lower position thereof shown in FIG. 1.

The eccentric 53 is so disposed on the drive shaft 54 relative to the position of the cam 20 on the drive shaft 19, that when the wheel 12 is being rotated by the cam 20, the shelf 46 is disposed inwardly of the rim 13 of the wheel 12, and, when the wheel 12 is stationary, the shelf 46 reciprocates upwardly and then downwardly through the opening 14 disposed at station 42. When the shelf 46 is disposed in its uppermost position, shown in FIG. 5, it is disposed in relatively closely underlying relation to the lowermost cup 36 in the stack of cups disposed in the inlet tube 29 and the coupling member 30.

The shelf 46 has an elongated passageway 46ᵃ extending therethrough, FIG. 5, one end of the passageway 46ᵃ opening upwardly through the central portion of the concavity 47, and the other end of the passageway 46ᵃ being connected by a suitable conduit 55, FIGS. 3 and 5, to the inlet side of a valve 56. The outlet side of the valve 56 is connected by a suitable conduit 57 to a source of vacuum, such as, for example, a suitable vacuum pump, or the like, not shown, and a suitable vacuum, such as, for example, a vacuum of twenty-nine inches of mercury, is maintained in the line 57 at all times during the operation of the machine 1. The valve 56 includes an actuating member 58, FIG. 3, which is pivotable upwardly and downwardly, as viewed in FIG. 3, to thereby open and close the connection between the conduits 55 and 57.

The drive shaft 54 extends outwardly from the gear housing 18 on the opposite side thereof from the eccentric 53, and a cam 59 is mounted on and rotatable with the drive shaft 54, on this latter side of the housing 18, FIG. 3. A cam follower 60 is mounted on and carried by the actuating member 58 of the valve 56, and is engaged with the periphery of the cam 59. The cam 59 is of such configuration, and is so disposed on the drive shaft 54, that during the operation of the machine 1, when a movement of the wheel 12 has been completed, and the shelf 46 has moved into its uppermost position as shown in FIG. 5, the cam 59 is operable to raise the actuating member 58 and thereby open the valve 56, to thus pull a vacuum in the line 46ᵃ in the shelf 46. The vacuum thus pulled in the shelf 46 is effective to pull the lowermost cup downwardly toward the shelf 46. During this downward movement of the lowermost cup 36, the pawls 31 pivot in a clockwise direction, as viewed in FIG. 5, to thereby lower the inner end portions thereof, and permit the lowermost cup 36 to drop off from the teeth 35. The thus dropped cup 36 falls downwardly into the concavity 47 on the shelf 46, and with the vacuum still being pulled in the line 46ᵃ, the shelf 46 is then moved downwardly by the eccentric 53 into the lowermost position of the shelf 46 shown in FIG. 1. This downward movement of the shelf 46 is effective to dispose the dropped cup 36 in the opening 14 disposed at the work station 42, and then move the shelf 46 downwardly below the lower end of the latter cup, as shown in FIG. 1. As the shelf 46 moves away from the thus dropped cup 36, the cam 59 moves into position wherein it is effective to permit the actuating member 58 of the valve 56 to move downwardly, to thereby close the connection between the conduits 55 and 57, and thereby cut off the vacuum to the conduit 55. At this same time, the cam 20 operatively engages the adjacent ones of the cam followers 22 on the wheel 21, to thereby index the wheel 13 to the next position, wherein the cup 36 which has just been positioned in the wheel 13 at the work station 42, is then disposed at the work station 43.

The outer end portions 61 of each of the pawls 31 is weighted. The end portions 61 are sufficiently heavy relative to the inner end portions of the pawls 31 that after the lowermost cup 36 in the stack of cups in the inlet tube 29 and the coupling member 30 has been dropped, as previously described, the weight of the end portions 61 is sufficiently great to cause the pawls 31 to pivot in a counterclockwise direction, as viewed in FIG. 5, to thereby permit the next lowermost cup 36 to drop downwardly off from the teeth 34 onto the teeth 35 into the position of lowermost cup 36 shown in solid lines in FIG. 5. It will be appreciated by those skilled in the art that at the completion of each indexing movement of the wheel 12, a new cup 36 is moved downwardly into the opening 14 disposed at the work station 42, in the above-described manner.

The openings 14 in the rim 13 of the wheel 12 are of such size that the outwardly turned free edge portions 37 of the lips 38 of the cups disposed in the openings 14, prior to the arrival of the cups at the work station 44, normally fit in the outer end portions 24 of the openings 14 with a relatively snug sliding fit. Hence, in some instances it may be that the cups 36 will not be disposed in the desired fully seated position in the openings 14, at the station 42. The machine 1 is so constructed that when the cups 36 arrive at the work station 43 from the work station 42, and while the cups are stationary at the work station 43, prior to the movement of the cups away from the work station 43 during the next indexing movement of the wheel 12, the cups 36 are pushed by a plunger 62 into the opening 14 disposed at the work station 43 to thereby insure that the cup 36 at the work station 43 is disposed in such position that the free edge 40 thereof is abuttingly engaged with the intermediate portion 25 of the side wall of the opening 14, as shown in FIG. 9.

The plunger 62 which performs this operation is slidably mounted in a housing 63, FIGS. 1 and 6, which is mounted on and secured to the outer face of the supporting plate 8 at work station 43. One end of a bell crank lever 64, which is journalled in and supported by a supporting bracket 65 projecting outwardly from the mounting plate 8, is pivotally connected to the outer end portion of the plunger 62 by a pin or bolt 66, which extends through an elongated opening 67 in the housing 63 into the upper end portion of the plunger 62. The other end portion of the bell crank lever 64 is connected by a link 68, FIG. 3, to one end of a bell crank lever 69 which is mounted on and secured to a shaft 70 which is journalled in and supported by another mounting bracket 71 also projecting outwardly from and carried by the supporting plate 8. A cam follower 72 is mounted on the other end portion of the bell crank lever 69, and is engaged with the outer periphery of a cam 73, which is secured to and rotatable with the drive shaft 54, between the eccentric 53 and the gear housing 18. The cam 73 is of such configuration, and is so disposed on the drive shaft 54, that it is effective to permit the plunger 62 to be held by suitable means, such as a spring 64a, FIG. 3, in fully upwardly retracted position, as shown in FIG. 6, during all rotative movement of the wheel 12, and when a cup 36 has been moved from the housing 42, and is stationary at the work station 43, the cam 73 is effective to move the plunger downwardly from the aforementioned retracted position shown in FIG. 6 to the fully extended position shown in FIG. 9, and then permit it to move back to the fully retracted position under the urging of the spring 64a prior to the next indexing movement of the wheel 12. The aforementioned downward movement of the plunger 62 is effective to push the cup 36 at the work station 43 firmly into the respective opening 14, to insure that the cup 36 disposed at the work station 45 is disposed in fully inserted position in its opening 14, with the free edge 40 of the lip 38 of the cup disposed in engagement with the intermediate portion 26 of the side wall of the opening 14, as shown in FIG. 9, before it leaves the work station 43.

The wheel 12 is preferably an aluminum casting, and suitable electrically operated heating elements, such as, for example, the heating elements known in the trade as "Calrod" elements 74 are embedded in the rim 13 and are connected through suitable conductors such as, for example, brushes 75 and a commutator 76, FIG. 1, to a suitable source of electric power, not shown. The heating elements 74 are of such capacity, and are so disposed in the wheel 12, that they are effective to maintain the rim 13 of the wheel 12 at a temperature effective to heat the free edge portion 37 of the lip 38 to such a temperature, during movement of the cups 36 from the work station 42 to the work station 44, effective to render the free edge portions readily deformable, so that the free edge portions 37 may be turned inwardly from the open position shown in FIGS. 8 and 9 to the closed position shown in FIG. 10 at the work station 44, without cracking or breaking the lips 38. For example, it has been found that with the cups 36 made of high impact polystyrene material, and with the wheel 12 making a complete revolution in approximately eleven seconds, it is desirable to maintain the temperature of the rim 13 of the wheel 12 at between 195° F. and 205° F., and preferably 200° F.

It will be seen that after each of the cups 36 has been positioned in its opening 14 by the plunger 62 at the work station 43, it is supported in the opening 14 in such position that only the free edge portion 37 of the lip 38 of the cup 36, and that portion of the side wall 39 of the cup 36 which is engaged with the corner 77 formed between the intermediate portion 25 and the lower end portion 23 of the side wall of the opening 14 are directly engaged with the rim 13 of the wheel 12. The engagement of these portions of the cups 36 with the rim 13 of the wheel 12 is relatively firm, and it will be seen that with the cups 36 so engaged with the rim 13, the heating of the cup 36 is effectively localized to substantially that area thereof disposed between that portion of the side wall 39 engaged with the corner 77, and the free end 40 of the lip 38, so that substantially only the lip 38 is heated by the rim 13 during movement of the cup 36 with the wheel 12, and the heating is substantially concentrated at the free edge portion 37 of the lip 38. Hence, any deleterious effects which might be caused by heating of other portions of the cups 36 are substantially eliminated by the present invention.

Another plunger 78 is reciprocably mounted in an elongated housing 79 mounted on and supported by the supporting plate 8 at work station 44, FIGS. 1 and 3. The plunger 78 is so disposed at the work station 44, that it is disposed in axial alignment with the openings 14, in the wheel 12, when the openings 14 are disposed at the work station 44. A male die 80 is mounted on and carried by the inner end portion of the plunger 78, FIGS. 1 and 10, in position to cooperate with the female die 81 afforded by the side wall portions 24 and 25 of each of the openings 14 in the wheel 12, when the respective opening 14 is disposed in stationary position at work station 44.

One end of a crank arm 82 is secured to and carried by the shaft 70 on which the bell crank lever 69 is mounted and the other end of the crank arm 82 is pivotally attached to the plunger 78 by a pin 83 which extends through elongated openings 79a in the housing 79. It will be remembered that when the cups 36 in the openings 14 are disposed at the work station 43, the plunger 62 is reciprocated inwardly and outwardly by the movement of the bell crank lever 69. This movement of the bell crank lever 69 and consequent oscillation of the shaft 70, is effective to simultaneously move the plunger 78 inwardly and outwardly relative to the wheel 18. The dies 80 and 81 are of such configuration, and the plunger 78 is so disposed relative to the wheel 12, that the inward movement of the plunger 78 effected by actuation of the bell crank lever 69 by the cam 73 is effective to move the die 80 inwardly from the fully outwardly retracted position shown in FIG. 1 into the fully inwardly extended position shown in FIG. 10. During such movement of the die 80, the latter moves into the outer end portion 24 of the opening 14 disposed at the work station 45, and pushes against the lip 38 of the cup disposed in such opening 14, in position to cause the free end portion 37 to move inwardly from the position shown in FIG. 8 to the closed position shown in FIG. 10, the free edge portion 37, during this curving movement thereof, following the contour of the portion 25 of the die 81. Thereafter, the movement of the bell crank lever 69 is effective to permit the plunger 78 to move outwardly under the urging of the spring 64a, to thereby move the die 80 outwardly from the fully inwardly extending position shown in FIG. 10 to the fully outwardly extended position shown in FIG. 1, in which latter position, the die 80 is disposed in radially outwardly spaced relation to the wheel 12.

During the next indexing movement of the wheel 12, the thus completed cup 36, which has just had its finished bead 41 formed at work station 44, moves with the opening 14 in which it is disposed to the next work station 45. At this latter station a pneumatic discharge tube 84, which may be made of any suitable material such as, for example, aluminum, or a suitable plastic material, is secured in an opening 85 in the supporting plate 8 by a suitable coupling member 86. A passageway 87 is formed in the side wall of tube 84 and opens inwardly into the tube 84 along a line disposed at a suitable acute angle such as an angle of 20 degrees, to the adjacent portion of the side wall 88 extending outwardly therefrom. Air under pressure is fed into the tube 84 through the opening 87 from a suitable conduit, such as a tube 89, one end of which is connected into the opening 87, and the other end of which may be attached to a suitable source of compressed air, not shown. The air from the tube 89 passes into the tube 84 in such a direction that it moves longitudinally outwardly through the tube 84 away from the machine 1. The velocity of the air 89 through the tube 89 and the pressure of the air in the tube 89 are such that a venturi-type action is afforded in the tube 84, which is effective to draw air outwardly through the tube 84 from the inner end 90 thereof, to thereby afford a pneumatic discharge device by which cups 36 at station 45 may be drawn upwardly into the tube 84 and discharged outwardly therefrom at a suitable receiving station, not shown. In one embodiment of the machine 1, wherein the cups 36 had an outside diameter of approximately two and fifteen-sixteenths inches, and the tube had an inside diameter of approximately three inches, with the tube 89 having an inside diameter of approximately one-quarter of an inch, successful operation of the discharge device was afforded by disposing the opening 87 at such an angle in the side wall 88 of the tube 84, that the longitudinal center line of the opening 87 is disposed at a twenty degree angle to the adjacent outer end portion of the side wall 8, and by feeding the air through the tube 89 at approximately twenty pounds of pressure.

Another shelf 91, is disposed at station 45, FIGS. 1, 3, and 7. The shelf 91 is secured to and carried by the upper end portion of a rod 92 which is slidably mounted in and supported by a housing 93 mounted on the upper face of the platform 6 of the base 2. The rod 92 extends through the platform 6, and is disposed at an upwardly inclined angle, substantially parallel to the longitudinal center line of the discharge tube 84. The shelf 91 is so disposed on the rod 92, that the center portion of the platform 94 thereof is disposed in alignment with the longitudinal center line of the tube 84. The lower end portion of the rod 92 is pivotally connected by linkage 95 to one end of a bell crank lever 96, which is journalled in and supported by the wall 5 of the base 2. The other end of the bell crank lever 96 is connected by a link 97 to one end of a crank arm 98, the other end of which is secured to and carried by the drive shaft 54, outwardly of the cam 59, FIG. 3. The crank 98 is so disposed on the drive shaft 54, and the connection between the crank arm 98 and the rod 92 is such that during all rotation of the wheel 12, the shelf 91 is disposed in inwardly spaced relation to the lower ends of the cups 36 disposed in the openings 14 when they move into station 45, as shown in FIG. 1, and when the wheel 12 is stopped, the shelf 91 is raised into the position shown in broken lines in FIG. 7, and then is lowered to a position wherein it is disposed inwardly of the rim 13 of the wheel 12. When the shelf 91 is raised into its fully raised position as shown in FIG. 7, it is effective to move the cup 36 disposed at station 45 upwardly into position wherein the upper end portion of the cup 36 is disposed in the lower end portion of the discharge tube coupling member 86, from which position the cup 36 is drawn upwardly into the tube 84, by the passage of air therethrough and is discharged therefrom at the aforementioned receiving station, not shown.

From the foregoing it will be seen that the machine 1 is fully automatic, the cups 36, with the free edge portions 37 thereof disposed in the open position shown in FIGS. 8 and 9, being automatically fed one at a time into respective ones of the openings 14, when the respective openings are disposed at station 42; the lip portions 38 of the cups being automatically heated, locally, while they are supported in the wheel 12; and the seating operation, the bead-forming operation, and the cup-discharging operation, also being automatically performed at stations 43–45, respectively, as the wheel 12 is being automatically indexed, one step at a time, through a complete revolution.

Such a machine affords a highly practical and efficient apparatus for forming a substantially closed bead on a plastic cup, or the like, of the type shown in FIG. 10.

Also, the present invention affords a novel method of forming such a bead on the free edge portion of the lip of a cup, or the like.

From the foregoing, it will be seen that the present invention affords a novel method for forming a turned-over lip on a plastic cup, and the like, and has also afforded novel apparatus for doing so, the novel apparatus being practical and efficient in operation and being so constituted and arranged that it may be readily and economically produced commercially.

Thus, while I have illustrated and described the preferred embodiment of my invention, it is to be understood that this is capable of variation and modification, and I therefore do not wish to be limited to the precise details set forth, but desire to avail myself of such changes and alterations as fall within the purview of the following claims.

I claim:

1. Apparatus for forming a substantially closed bead on the lips of plastic cups of the type having side walls with the free edge portions of the lips thereon projecting outwardly and downwardly relative to the remainder of said side walls, said apparatus comprising drive means; a wheel operably connected to said drive means for rotation thereby in a series of equal partial revolutions; four work stations disposed around the periphery of said wheel; said wheel including a rim having openings therethrough spaced from each other around the periphery of said wheel in such position that at the end of each of said partial revolutions each of said stations has a respective one of said openings disposed thereat; means at the first of said stations for feeding a cup into each of said holes when said hole is disposed at said one station; means; at the second of said stations in the direction of rotation of said wheel, operable by said drive means in timed relation to said rotation of said wheel for seating said last-mentioned cup in predetermined position in said last-mentioned opening when the latter is disposed at said second station; means, at the third of said stations in the direction of rotation of said wheel, for turning said free edge portion of said last-mentioned cup inwardly toward the remainder of the side wall of said cup when said cup is disposed at said third station; means for heating said free edge portion of said last-mentioned cup, during movement of said cup with said wheel from said second station to said third station, to a high enough temperature to render said free edge portion readily deformable; and means, at the fourth of said work stations in the direction of rotation of said wheel, for discharging said last-mentioned cup outwardly from said apparatus when said cup is disposed at said fourth station.

2. Apparatus as defined in claim 1, and in which said openings in said rim have female die means in one end portion thereof, and in which said die means includes an enlarged portion, and an inwardly sloping other portion, and in which said cups, when they are seated in said predetermined position, are disposed in said openings in position wherein said free edge portions are disposed in juxtaposition to said enlarged portions of said dies, and the free edges of said free edge portions are disposed in abutting engagement with said inwardly sloping portions of said dies.

3. Apparatus as defined in claim 1, and in which said means at said first station includes a tube for storing a plurality of said first-mentioned cups in stacked relation to each other, pawl means mounted on said tube in position to support said cups in said tube, said pawl means having a normal position wherein it is disposed in position to supportingly engage the lowermost one of said cups in said tube, and another position wherein it is effective to drop said cup and supportingly engage the next lowermost ones of said cups in said tube, said pawl means being pivotable in a vertical direction between said two positions which includes weight disposed thereon in position effective to return said pawl means from said other position to said normal position and vacuum means for moving said cup dropped by said pawl means into said opening disposed at said first station.

4. Apparatus as defined in claim 3, and in which said means at said first station includes shelf means movable by said drive means in timed relation to said rotation of said wheel for lowering said cups into said openings when said openings are disposed at said first station and for controlling the vacuum exerted by the vacuum means upon the cups.

5. The method of forming a substantially closed bead on the lip of a thermoplastic cup, or the like, which comprises disposing such a cup having the free edge portion of the lip thereof turned outwardly and downwardly in a die wherein only the lip portion and a small fraction of the side wall surface of the cup adjacent to the lip portion is engaged by the die, heating the lip portion to a temperature high enough for such material to be readily deformable, turning said free edge portion inwardly toward the remainder of the side wall portion into such position that the free edge of said free edge portion faces substantially directly at said remainder of said side wall portion, and removing said cup from said die.

6. A method of forming a plastic cup with a rolled rim comprising the steps of providing a molded plastic cup with a downturned skirt at its upper edge, said skirt defining an outer surface area, thereafter applying localized heat to the outer surface area of the downturned skirt to bring the temperature of the skirt to a substantially uniform formable level, immediately thereafter rolling the bottom edge of the skirt inwardly on a radius toward the cup wall, and thereafter discontinuing the application of heat to the skirt.

References Cited by the Examiner

UNITED STATES PATENTS

| | | |
|---|---|---|
| 483,957 | 10/1892 | Godfrey. |
| 1,567,007 | 12/1925 | Raiche. |
| 1,768,768 | 7/1930 | Johnson. |
| 1,876,931 | 9/1932 | Heywood et al. _____ 93—39.3 |
| 1,983,361 | 12/1934 | Gazette _____ 93—36.5 |
| 2,114,596 | 4/1938 | Frungia. |
| 2,287,675 | 6/1942 | Fair et al. _____ 18—21 |
| 2,532,844 | 12/1950 | Hulbert et al. |
| 2,859,575 | 11/1958 | Lehmann _____ 93—36.5 XR |
| 3,065,677 | 11/1962 | Loeser _____ 93—36.5 |
| 3,096,546 | 7/1963 | Edwards _____ 18—56 XR |

FOREIGN PATENTS

| | | |
|---|---|---|
| 604,133 | 8/1960 | Canada. |
| 16,178 | 1/1912 | Great Britain. |

ROBERT F. WHITE, *Primary Examiner.*

MICHAEL V. BRINDISI, MORRIS LIEBMAN, ALEXANDER H. BRODMERKEL, *Examiners.*

M. R. DOWLING, M. H. ROSEN, *Assistant Examiners.*